United States Patent
Chen et al.

(10) Patent No.: US 11,954,836 B2
(45) Date of Patent: Apr. 9, 2024

(54) METHOD FOR PROCESSING IMAGE, ELECTRONIC DEVICE, AND STORAGE MEDIUM

(71) Applicant: BEIJING XIAOMI MOBILE SOFTWARE CO., LTD., Beijing (CN)

(72) Inventors: Meiya Chen, Beijing (CN); Qiang Rao, Beijing (CN); Ran Zhu, Beijing (CN); Shuangshuang Yin, Beijing (CN); Piyao He, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 374 days.

(21) Appl. No.: 17/405,820

(22) Filed: Aug. 18, 2021

(65) Prior Publication Data
US 2022/0309617 A1    Sep. 29, 2022

(30) Foreign Application Priority Data
Mar. 26, 2021 (CN) .......................... 202110328627.X

(51) Int. Cl.
*G06T 5/70* (2024.01)

(52) U.S. Cl.
CPC ...... *G06T 5/70* (2024.01); *G06T 2207/10028* (2013.01); *G06T 2207/20012* (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 9,335,553 | B2* | 5/2016 | Lanman | G02B 30/32 |
| 10,348,979 | B2* | 7/2019 | Pit Rada | G06T 5/20 |
| 10,834,331 | B2* | 11/2020 | Pit Rada | H04N 23/80 |
| 11,132,772 | B2* | 9/2021 | Luo | H04N 13/128 |
| 2012/0249743 | A1* | 10/2012 | Kim | H04N 23/80 |
| | | | | 348/E5.029 |

(Continued)

OTHER PUBLICATIONS

McGraw, T. (2015) Fast Bokeh effects using low-rank linear filters. Vis Comput 31, 601-611. https://doi.org/10.1007/s00371-014-0986-6 (Year: 2015).*

(Continued)

*Primary Examiner* — Vu Le
*Assistant Examiner* — Charles C L Penny
(74) *Attorney, Agent, or Firm* — COZEN O'CONNOR

(57) ABSTRACT

A method, electronic device and storage medium for processing an image using depth-of-field information is disclosed. The method includes obtaining a weight matrix and a weight image based on depth-of-field data of an input image; obtaining a first horizontal summed area table corresponding to the weight matrix and a second horizontal summed area table corresponding to the weight image by performing horizontal summing operation on the weight matrix and the weight image; obtaining a first weighted blurring image corresponding to the weight matrix based on the first horizontal summed area table, and obtaining a second weighted blurring image corresponding to the weight image based on the second horizontal summed area table; and obtaining a pixel value of the pixel in a target image based on the first and second weighted blurring images.

20 Claims, 13 Drawing Sheets

(56) References Cited

U.S. PATENT DOCUMENTS

| | | | | |
|---|---|---|---|---|
| 2013/0071028 A1* | 3/2013 | Schiller | ..................... | G06T 7/11 |
| | | | | 382/180 |
| 2014/0294299 A1* | 10/2014 | Kim | .......................... | G06T 5/50 |
| | | | | 382/167 |
| 2016/0093032 A1* | 3/2016 | Lei | ............................ | G06T 5/50 |
| | | | | 382/264 |
| 2020/0175651 A1* | 6/2020 | Zhang | ..................... | G06T 5/002 |

OTHER PUBLICATIONS

Wadhwa, N., Garg, R., Jacobs, D.E., Feldman, B.E., Kanazawa, N., Carroll, R., Movshovitz-Attias, Y., Barron, J.T., Pritch, Y., and Levoy, M.,. (2018), Synthetic depth-of-field with a single-camera mobile phone. ACM Trans. Graph. 37, 4, Article 64, 13 pages. https://doi.org/10.1145/ (Year: 2018).*

Hensley, J., Scheuermann, T., Coombe, G., Singh, M. and Lastra, A. (2005), Fast Summed-Area Table Generation and its Applications. Computer Graphics Forum, 24: 547-555. https://doi.org/10.1111/j.1467-8659.2005.00880.x (Year: 2005).*

\* cited by examiner

METHOD FOR PROCESSING IMAGE, ELECTRONIC DEVICE, AND STORAGE MEDIUM

CROSS REFERENCE TO RELATED APPLICATIONS

This application claims the benefit of priority to Chinese Application No. 202110328627.X, filed on Mar. 26, 2021, the entire content of which is incorporated herein by reference.

TECHNICAL FIELD

The disclosure relates to a field of image processing technologies, and particularly to a method and a device for processing an image using depth-of-field information.

BACKGROUND

At present, a depth-of-field range can be adjusted while an electronic device is capturing an image by adjusting focal length, aperture size or shutter speed of a camera or a smart terminal by the user to obtain a blurred image. In the blurred image, a photographed object is clear, background is blurred, and the blurring degree of the background changes progressively with depth of the image. Thus, an artistic effect of highlighting the object and blurring the background is achieved.

In related arts, commonly used methods for rendering an image based on the depth of field include Gathering Blur method, which sums up pixel values of pixels corresponding to a blurring kernel to obtain a blurring value of a current pixel. Since the blurring value of the current pixel is only related to a single blurring kernel sliding window, the calculation can be parallelized to meet requirements of high performance. To implement the parallelized calculation, a summed area table can be used in the related arts. For example, a square-based mean blurring calculation is simplified to calculate four corners of the summed area table. That is, the pixel value of each pixel in the summed area table corresponds to a sum of pixel values of all pixels at the upper left corner of the summed area table. A square-based mean blurring value can be obtained based on the subtraction operation on the pixel values of the four corners of the square.

SUMMARY

In one embodiment, a method for processing an image is provided. The method includes: obtaining depth-of-field data of an input image and obtaining a weight matrix of the input image based on the depth-of-field data; obtaining a product of a weight corresponding to a pixel in the weight matrix and a pixel value corresponding to the pixel in the input image and obtaining a weight image, in which the product is the pixel value of the pixel in the weight image; obtaining a first horizontal summed area table corresponding to the weight matrix by performing a horizontal summing operation on the weight matrix and obtaining a second horizontal summed area table corresponding to the weight image by performing the horizontal summing operation on the weight image, in which the horizontal summing operation refers to, obtaining a sum of the pixel value of a pixel and pixel value of pixels before the pixel and on the same row with the pixel; obtaining a blurring value corresponding to the pixel of the weight matrix based on the first horizontal summed area table and obtaining a first weighted blurring image corresponding to the weight matrix, and obtaining a blurring value corresponding to the pixel of the weight image based on the second horizontal summed area table and obtaining a second weighted blurring image corresponding to the weight image; and obtaining a ratio of the blurring value corresponding to the pixel in the second weighted blurring image to the blurring value corresponding to the pixel in the first weighted blurring image, and determining the ratio as the pixel value corresponding to the pixel in a target image; the target image being obtained by blurring the input image.

In one embodiment, an electronic device is provided. The electronic device includes: a processor, and a memory, configured to store computer programs executed by the processor. The processor is configured to execute the computer programs stored in the memory to execute a method as described above.

In one embodiment, a non-transitory computer readable storage medium is provided. When computer program stored in the storage medium are executed by a processor, the processor is configured to execute a method as described above.

It is to be understood that the above general description and the following detailed description are only exemplary and explanatory and do not limit the disclosure.

BRIEF DESCRIPTION OF THE DRAWINGS

The drawings herein are incorporated into the specification and constitute a part of the specification, show embodiments in accordance with the disclosure and are used to explain the principle of the disclosure together with the specification.

DETAILED DESCRIPTION

Exemplary embodiments will be described in detail here, and examples thereof are shown in accompanying drawings. When the following description refers to the drawings, unless otherwise indicated, the same numbers in different drawings indicate the same or similar elements. The exemplary described embodiments below do not represent all the embodiments consistent with the disclosure. Rather, they are merely examples of devices consistent with some aspects of the disclosure as detailed in the appended claims.

As discussed above, in the square-based mean blurring calculation, since each pixel of the summed area table corresponds to the sum of pixel values of all pixels in the upper left corner, the above method is not applicable when the blurring kernel has a shape other than the square and thus has poor scalability.

In order to solve technical problems existing in related arts, embodiments of the disclosure provide a method for processing an image. By obtaining the horizontal summed area tables, the acquisition of the sum of pixel values on the signal row can be converted into an addition operation or a subtraction operation on the summing values of two pixels. The number of operations as disclosed herein is less than 4 operations to save calculation time. In addition, after obtaining the sum of pixel values for each row, the sum of each row is summed up to obtain the blurring value of the pixel. In other words, the length of each row is not limited in the disclosure, and different numbers of pixels in a row can form any blurring kernel shape. That is, the disclosure can be applied to any blurring kernel shapes, which can increase the application scope.

Figures 1, 2:
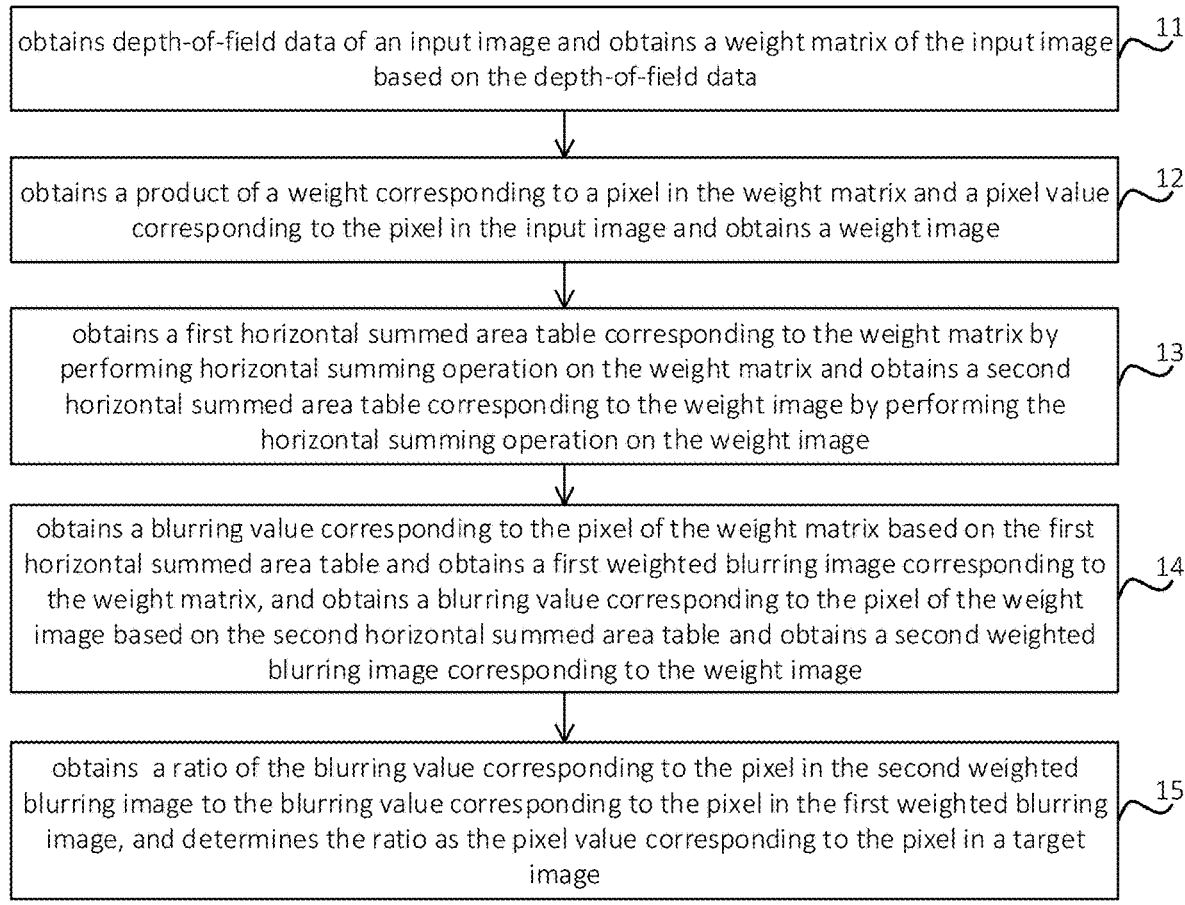
FIG. 1 is a flowchart illustrating a method for processing an image according to some embodiments of the disclosure.
FIG. 2 is a flowchart illustrating a method for obtaining a weight matrix according to some embodiments of the disclosure.

The method can be applied to an electronic device, such as a smart phone, personal computer, tablet computer, or server. FIG. 1 is a flowchart illustrating a method for processing an image according to embodiments of the disclosure. As illustrated in FIG. 1, the method can include the following.

At block 11, depth-of-field data of an input image is obtained and a weight matrix of the input image is obtained based on the depth-of-field data.

The electronic device may be provided with a camera module. After being activated, the camera module can work based on a preset working mode or a previous working mode. A touch screen or a control key provided on the electronic device can detect in real time or periodically a trigger operation from the user. The electronic device can send an operation signal to a processor when detecting that there is a trigger operation from the user. After receiving the operation signal, the processor can analyze the operation signal, generate a control signal corresponding to the operation signal, and send the control signal to the camera module. After receiving the control signal, the camera module can capture an image or record a video in response to the control signal, send the image or the video to the processor or store the image or the video in a designated location (such as local storage device, cloud end, external storage device communicating with the electronic device).

It is to be noted that, a video includes multiple images and the video blurring can be implemented by processing each image. Therefore, in the disclosure, only descriptions about processing one image are given for the clarity of description.

The processor of the electronic device may directly use an image received from the camera module as the input image or read an image from a designated location as the input image. After acquiring the input image, the processor may acquire the depth-of-field data of the input image. For example, the input image can be an image containing depth data. The processor can obtain configuration data (such as aperture size or focal length) corresponding to the input image and determine the depth-of-field data (such as depth-of-field range or position) based on the configuration data and the depth data.

The processor of the electronic device can obtain the weight matrix of the input image based on the depth-of-field data. The weight matrix refers to a collection of weights used to set for pixels contained in the input image. That is, each weight value contained in the weight matrix is in one-to-one correspondence with each pixel contained in the input image. The size of the weight matrix is the same with the size of the input image.

The electronic device can obtain the weight matrix of the input image by the following. As illustrated in FIG. 2, at block 21, the processor can obtain the weight matrix of the input image by setting weights of pixels within the depth-of-field range as zero and setting weights of pixels outside the depth-of-field range as a preset value.

It is to be noted that setting the weights of pixels within the depth-of-field range as zero means that the pixels within the depth-of-field range are not used for a subsequent blurring value acquisition, which can reduce a probability of diffusing the color of a region within the depth-of-field range (which can be understood as an object region) to regions outside the depth-of-field range (which can be understood as a background).

It is to be noted that setting the weights of pixels outside the depth-of-field range as the preset value means that the weights of pixels outside the depth-of-field range are set to a non-zero value and the weight of each pixel outside the depth-of-field range is the same with each other, which can ensure that these pixels are not affected by the subsequence blurring value acquisition.

In practical applications, there will be one or more light spots outside the depth-of-field range and the same weight of each pixel outside the depth-of-field range may cause that the blurring values of pixels at the light spots are lower than needed in the subsequent blurring value acquisition. Therefore, a brightness increasing operation can be performed on the light spots in the disclosure. As an example, the processor can input the input image to a preset image recognition model (such as a convolutional neural network) and positions of the light spots in the input image can be determined through the image recognition model. Thus, the weight of each pixel at the light spots can be increased. As another example, the processor can obtain a preset pixel value threshold (such as 235, which is adjustable) and compare the pixel value of each pixel outside the depth-of-field range with the preset pixel value threshold. When the pixel value of a pixel is less than the pixel value threshold, the weight of the pixel can be set as a preset first value (such as 10, which is adjustable). When the pixel value of a pixel exceeds (is greater than or equal to) the pixel value threshold, the weight of the pixel can be set as a preset second value (such as 180, which is adjustable). The preset first value is smaller than the preset second value.

In practical applications, the weight can be represented by Alpha=a*scale1, where when the pixel value is less than the pixel value threshold, "a" equals to for example 10 and "scale1" equals to for example 1, and when the pixel value is greater than or equal to the pixel value threshold, "a" equals to for example 10 and "scale1" equals to for example 18. That is, when "a" has a fixed value, the effect of increasing the brightness of the light spots can be achieved by adjusting the value of "scale1".

After setting a respective weight for each pixel of the input image, the weight matrix corresponding to the input image can be obtained. The weight matrix can be regarded as an image where the pixel value of each pixel is the corresponding weight. For the convenience of description, the weight matrix is described as an image in the following.

At block 12, a product of the weight corresponding to each pixel and contained in the weight matrix and the pixel value corresponding to each pixel and contained in the input image is obtained and a weight image is obtained. Each product is the pixel value of a corresponding pixel of the weight image.

In detail, for each pixel of the weight image, the product of the weight corresponding to the pixel in the weight matrix and a pixel value corresponding to the pixel in the input image is obtained. Each pixel of the weight image has a respective pixel coordinate. The weight corresponding to the pixel in the weight matrix refers to the weight having the same pixel coordinate with the pixel in the weight matrix and the pixel value corresponding to the pixel in the input image refers to the pixel value having the same pixel coordinate with the pixel in the input image. The product can be used as the pixel value having the same pixel coordinate in the weight image.

In the disclosure, descriptions about obtaining the pixel value of one pixel are given for the convenience of description. The method of obtaining the pixel values of other pixels is the same as the method described here, which is not repeated.

The processor of the electronic device may obtain the products of the weights in the weight matrix and the corresponding pixel values in the input image to obtain the weight image, where the products are the pixel values in the weight image. A relationship between the weight image, the weight matrix and the input image is expressed as:

$$I_{weight} = I_{sharp} \cdot \text{Alpha},$$

where, $I_{weight}$ represents the weight image, Alpha represents the weight matrix, $I_{sharp}$ represents the input image, and the operator · represents a dot product (also called scalar product) operation.

At block 13, a first horizontal summed area table corresponding to the weight matrix is obtained by performing horizontal summing operation on the weight matrix and a second horizontal summed area table corresponding to the weight image is obtained by performing horizontal summing operation on the weight image. The horizontal summing operation refers to, for each pixel, obtaining a sum of the pixel value of the pixel and the pixel values of pixels before the pixel and on the same row with the pixel.

Figure 3:
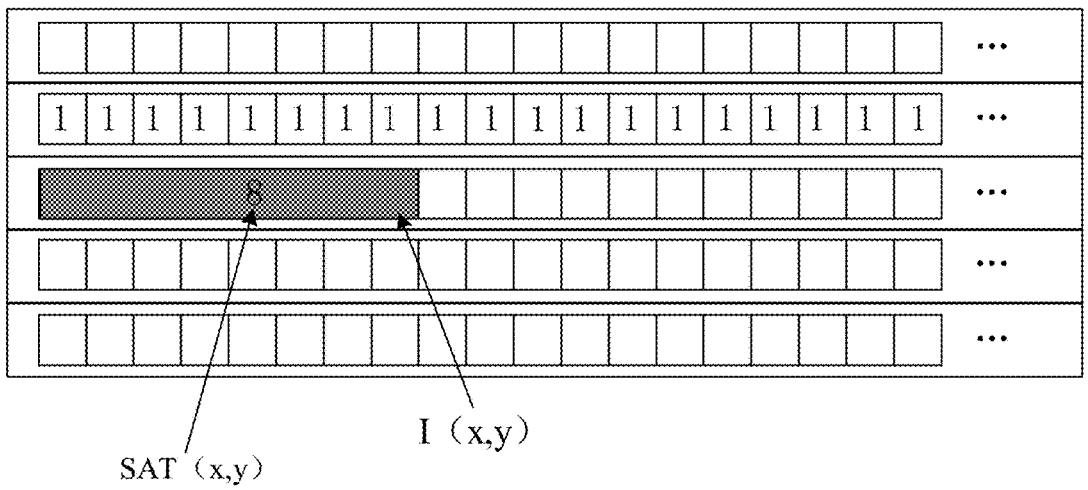
FIG. 3 is a schematic diagram illustrating a horizontal summed area table according to some embodiments of the disclosure.

The processor of the electronic device can obtain a horizontal summed area table of the weight matrix and a horizontal summed area table of the weight image respectively. The horizontal summing operation refers to, for each pixel, obtaining the sum of the pixel value of the pixel and the pixel values of pixels before the pixel and on the same row with the pixel. As illustrated in FIG. 3, the pixel value of each pixel in an original image is for example 1 and there are 7 pixels on the left of a pixel I(x,y) on the same row with the pixel I(x,y). A horizontal summing value of the pixel I(x,y) can be obtained as 8 by summing the pixel value of the pixel I(x,y) and the pixel values of the seven pixels before the pixel I(x,y). In FIG. 3, only the second row illustrates the pixel values (i.e., 1) and only the eighth pixel, i.e., the I(x,y), on the third row illustrates the horizontal summing value SAT(x,y)=8. It can be understood that, only the acquisition of the horizontal summing value of one pixel is illustrated in FIG. 3, and the horizontal summing value of other pixels can be obtained in the same way.

It is to be noted that, the horizontal summing operation is used instead of a vertical summing operation, which can increase the continuity of memory traversal in subsequent processing of the image by a DSP (digital signal process) chip to shorten processing time. It can be understood that, without considering the DSP chip, the vertical summing operation can be used in the disclosure, or the direction of the image traversal can be adjusted. For example, the row-based image traversal changes to column-based image traversal, and thus the horizontal summing operation can be replaced with the vertical summing operation, which can increase the continuity of memory traversal. Any suitable method can be selected based on detailed application scenarios and corresponding to solutions are within the protection scope of the disclosure.

In practical applications, the subsequent blurring value acquisition for each pixel is to calculate a sum of pixel values of all pixels within a blurring kernel. In this case, for each pixel in first few rows or columns of the weight image or the weight matrix, the corresponding blurring kernel may include edge areas of the weight image or the weight matrix. These edge areas may have no pixels and may affect the blurring value acquisition for each pixel in the first few rows or columns. Therefore, in the disclosure, the processor can perform image padding. For example, the processor may perform the image padding on the weight matrix and the weight image respectively to obtain a padded weight matrix and a padded weight image. The number of rows or columns to be padded is related to the blurring kernel radius. For example, the maximum blurring kernel radius corresponding to the first row of the weight matrix equals to 9 pixels, and thus 9 rows of pixels are padded before the first row. Pixel values of the padded pixels can be preset or can be equal to the pixel values of pixels on the first row.

Based on the above principles, the processor can obtain a horizontal summed area table corresponding to the padded weight matrix (called the first horizontal summed area table for distinguishing) and obtain a horizontal summed area table corresponding to the padded weight image (called the second horizontal summed area table for distinguishing).

At block 14, a first weighted blurring image corresponding to the weight matrix is obtained based on the blurring value corresponding to each pixel contained in the weight matrix that is obtained based on the first horizontal summed area table. A second weighted blurring image corresponding to the weight image is obtained based on the blurring value corresponding to each pixel contained in the weight image that is obtained to obtain the second horizontal summed area table.

The processor of the electronic device can obtain the first weighted blurring image corresponding to the weight matrix and the second weighted blurring image corresponding to the weight image.

For example, the first weighted blurring image can be obtained as follows. In this disclosure, only descriptions of obtaining the blurring value of one pixel is given in the disclosure and the blurring values of other pixels can be obtained in the same way as described here.

Figure 4:
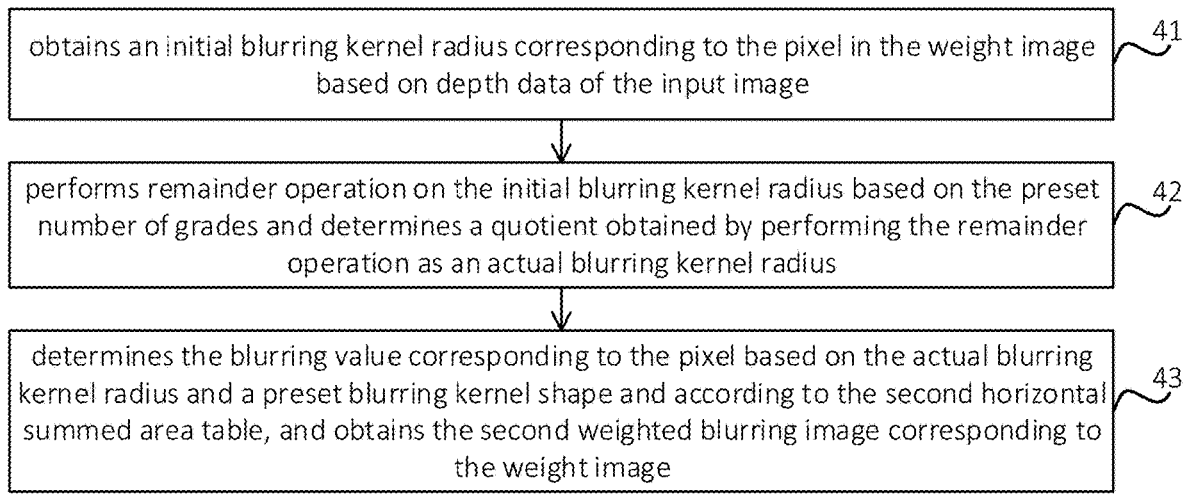
FIG. 4 is a flowchart of obtaining a blurring value according to some embodiments of the disclosure.

As illustrated in FIG. 4, in block 41, the processor may obtain an initial blurring kernel radius corresponding to a pixel in the input image based on depth data of the input image. The depth data is positively correlated to the initial blurring kernel radius. That is, as the depth increases, the corresponding initial blurring kernel radius increases. Correspondence models between the depth data and the initial blurring kernel radii can be set based on detailed scenarios. These correspondence models are within the protection scope of the disclosure.

At block 42, the processor may obtain the preset number of grades (e.g., the preset number is 4), perform remainder operation on the initial blurring kernel radius based on the preset number of grades, and determine a quotient obtained by performing the remainder operation as an actual blurring kernel radius corresponding to the pixel. Reasons for performing the above block 42 include the following. The input image includes discrete pixels, each pixel has a respective depth and each depth corresponds to a respective initial blurring kernel radius, and the determined initial blurring kernel radius is an integer. In a small-size image or a down-sampled image with a high down sampling ratio, an obvious blurring layered situation caused by different blurring kernel radii may exist. For example, the blurring layered situation easily exists in the high-frequency texture region. Therefore, the blurring kernel radius that is multiple of integer is subdivided into multiple grades (the number of the multiple grades equals to the preset number of grades), and the multiple grades are re-numbered with integers. A blurring kernel radius that is decimal is realized on these levels. After the subdivision, given that the subdivided blurring kernel radius corresponding to the pixel is scale_radius, the actual blurring kernel radius corresponding to the pixel can be obtained through a following equation:

$$\frac{scale\_radius}{scale} = radius \cdots res;$$

where, scale represents the preset number of grades (e.g., 4); radius is the quotient by performing the remainder operation on the scale-radius; res represents the remainder which can be used for weighting in the subsequent blurring value calculation. The actual blurring kernel radius is obtained by rounding up the value of the radius based on the remainder. That is, when the remainder equals to 0, the actual blurring kernel radius equals to the quotient. When the remainder does not equal to 0, the actual blurring kernel radius equals to a value obtained by adding 1 to the quotient.

At block 43, the processor may determine the blurring value corresponding to the pixel based on the first horizontal summed area table, the actual blurring kernel radius, and a preset blurring kernel shape. The preset blurring kernel shape can be set in a camera module in advance, including but not limited to, circle, square, polygon, heart shape, five-pointed star shape, which can be set by the user based on detailed scenarios. The blurring kernel shape can be used for the blurring value acquisition, and the shape of the light spots in a subsequent target image is the same or similar to the above-mentioned blurring kernel shape, which can improve the user experience.

For example, the second weighted blurring image can be obtained as follows. In this disclosure, only descriptions of obtaining the blurring value of one pixel are given in the disclosure and the blurring values of other pixels can be obtained in the same way as described here.

The processor can obtain an initial blurring kernel radius corresponding to the pixel of the weight image based on the depth-of-field data, perform the remainder operation on the initial blurring kernel radius with the preset number of grades, determine a quotient obtained by performing the remainder operation as an actual blurring kernel radius corresponding to the pixel, and use a remainder obtained by performing the remainder operation as a weight in a subsequent smoothing operation. When the remainder is zero, no smoothing operation is performed; and when the remainder is not zero, the smoothing operation is performed, to reduce the amount of calculation. The processor can determine the blurring value corresponding to the pixel based on the second horizontal summed area table, the actual blurring kernel radius and the preset blurring kernel shape. It can be understood that, the manner for obtaining the second weighted blurring image is the same with that for obtaining the first weighted blurring image. Details can refer to descriptions of embodiments of FIG. 4.

Figure 5:
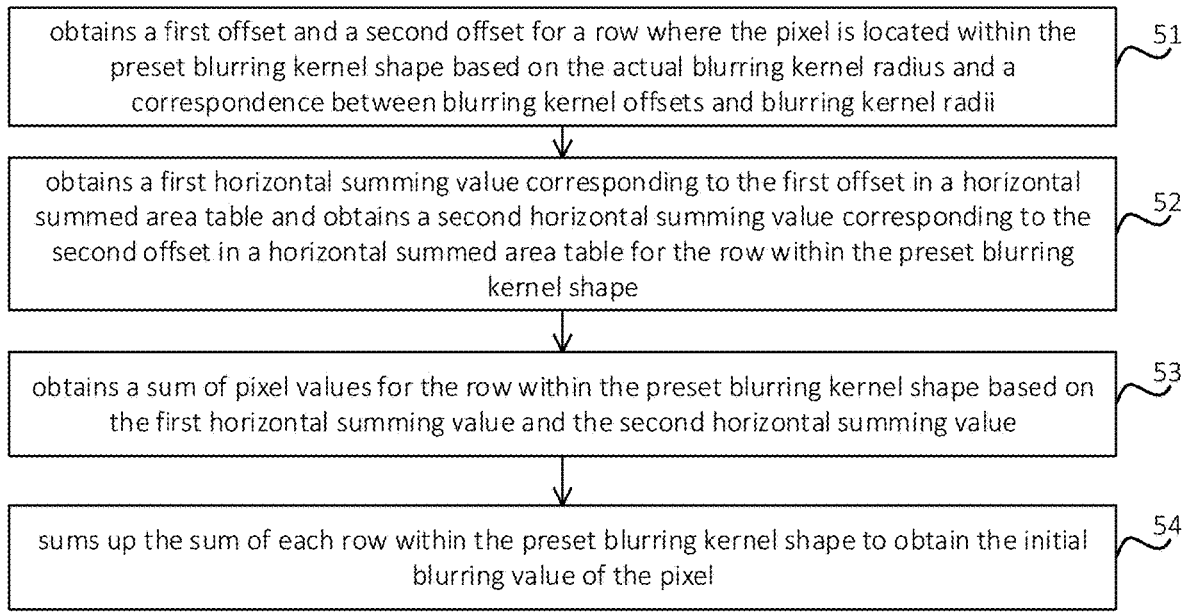
FIG. 5 is another flowchart of obtaining blurring value according to some embodiments of the disclosure.

As illustrated in FIG. 5, determining by the processor, the blurring value corresponding to the pixel based on the first horizontal summed area table, the actual blurring kernel radius and the preset blurring kernel shape can include the following.

At block 51, the processor can obtain a first offset and a second offset for a row where the pixel is located within the blurring kernel shape based on the actual blurring kernel radius of the pixel and a correspondence between blurring kernel offsets and blurring kernel radii. The correspondence between the blurring kernel offsets and the blurring kernel radii can be obtained as follows.

Figure 6:
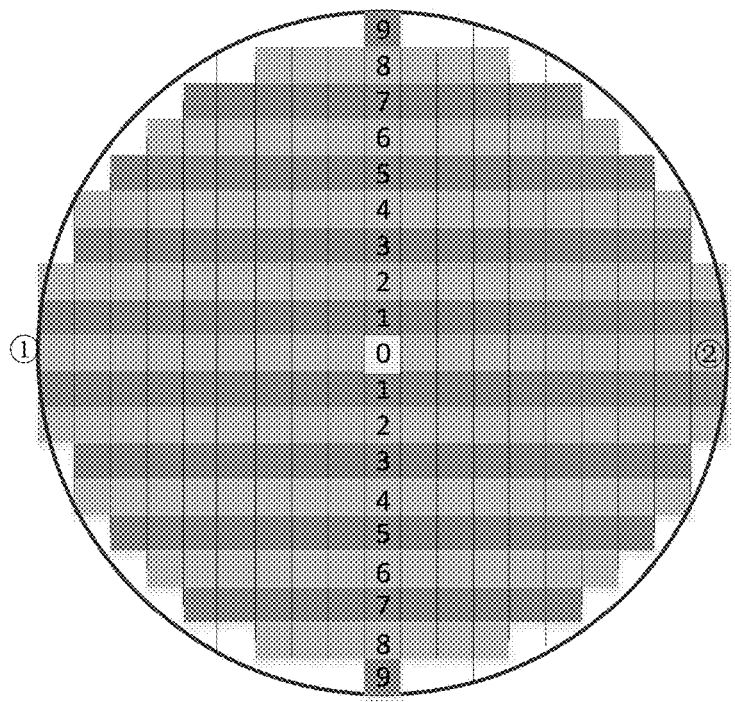
FIG. 6 is a schematic diagram illustrating a circular blurring kernel according to some embodiments of the disclosure.
Figure 7A:
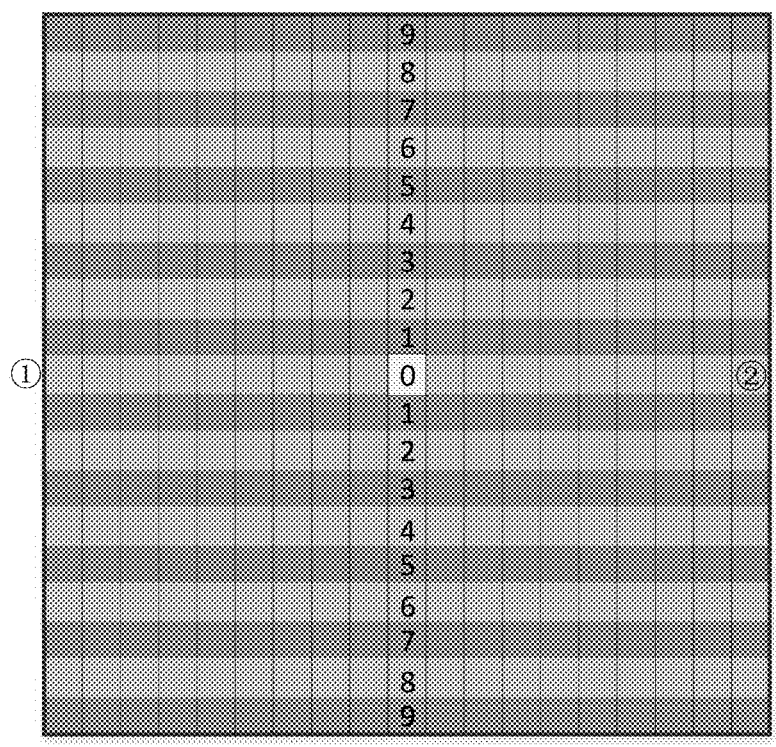
FIG. 7A is a schematic diagram illustrating a square blurring kernel according to some embodiments of the disclosure.
Figure 7B:
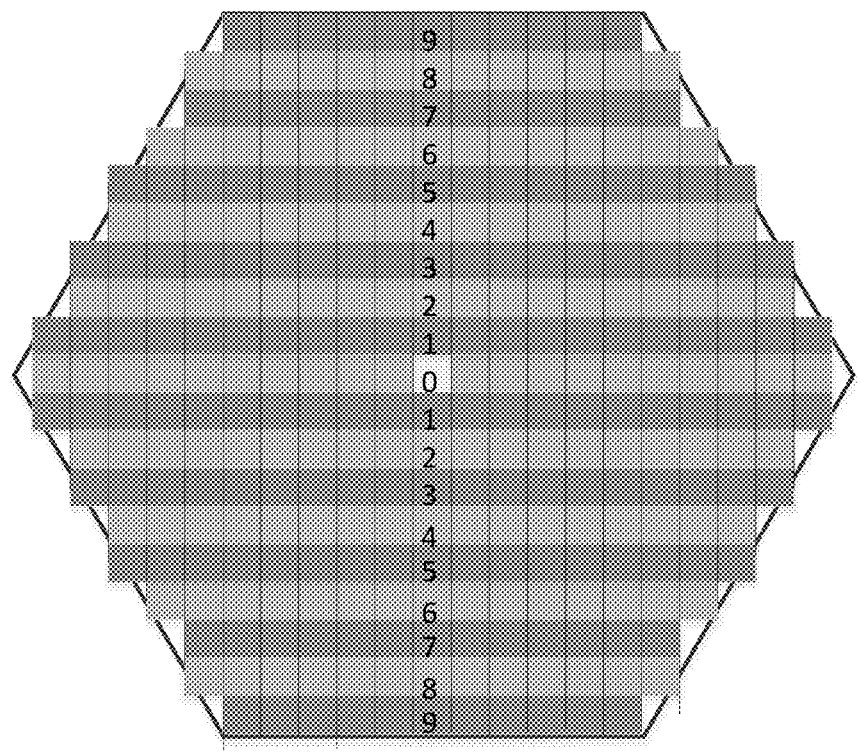
FIG. 7B is a schematic diagram illustrating a hexagonal blurring kernel according to some embodiments of the disclosure.
Figure 7C:
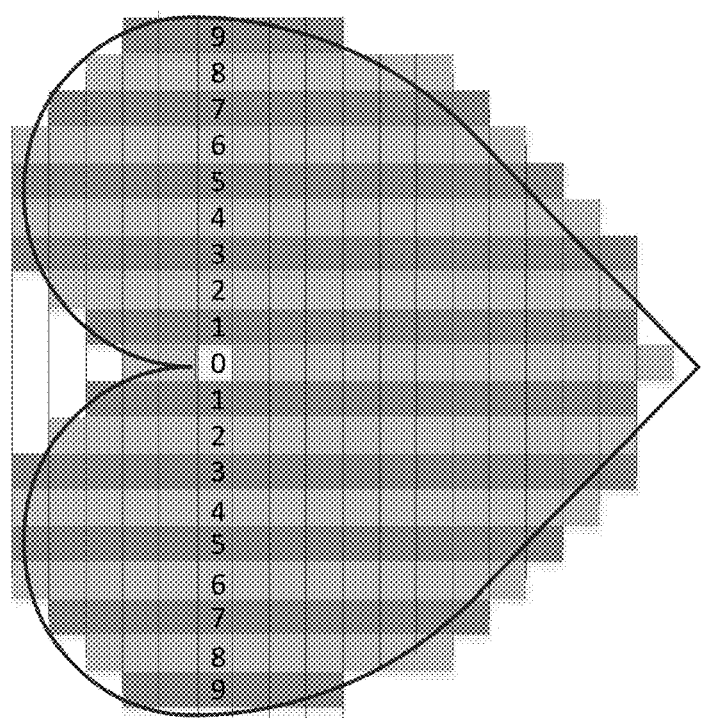
FIG. 7C is a schematic diagram illustrating a heart-shape blurring kernel according to some embodiments of the disclosure.
Figure 7D:
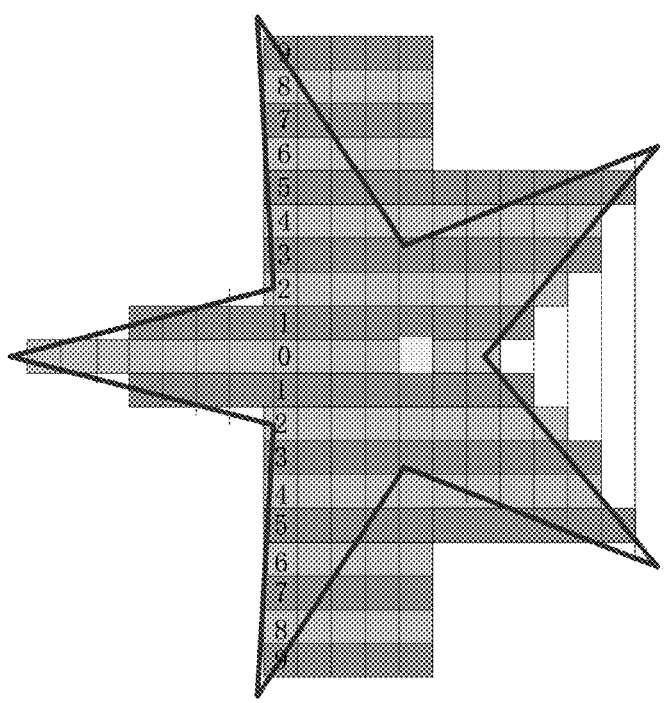
FIG. 7D is a schematic diagram illustrating a five-pointed-star-shape blurring kernel according to some embodiments of the disclosure.

Each blurring kernel shape corresponds to a respective correspondence between blurring kernel offsets and blurring kernel radii. The correspondence includes respective blurring kernel offsets corresponding to different blurring kernel radii. The blurring kernel offset refers to a horizontal offset of a leftmost pixel relative to a central pixel and a horizontal offset of a rightmost pixel relative to the central pixel in the same row within the blurring kernel shape of the pixel. The first offset refers to a horizontal offset of a pixel on the left of the leftmost pixel relative to the central pixel, and the second offset refers to a horizontal offset of the rightmost pixel relative to the central pixel. As illustrated in FIG. 6, the blurring kernel shape is a circle and the blurring kernel radius equals 9 pixels. In this case, Table 1 shows the left offset and the right offset (i.e., the second offset) of each row.

TABLE 1 offsets within a circular blurring kernel having a radius of 9 pixels

| Row No. | 0 | 1 | 2 | 3 | 4 | 5 | 6 | 7 | 8 | 9 |
|---|---|---|---|---|---|---|---|---|---|---|
| left offset | 9 | 9 | 9 | 8 | 8 | 7 | 6 | 5 | 6 | 0 |
| right offset | 9 | 9 | 9 | 8 | 8 | 7 | 6 | 5 | 6 | 0 |

Since the circle is a symmetric structure, Table 1 only shows the offsets for the lower half of the circle, and the offsets of the upper half of the circle can be also obtained based on Table 1. In the $0^{th}$ row, the horizontal offset of the leftmost pixel on this row relative to the central pixel (labelled as 0) on this row is 9, and the horizontal offset of the rightmost pixel is also 9.

In FIG. 6, a pixel before (or here on the left of) the leftmost pixel is represented by ① and the rightmost pixel is represented by ②. In the subsequent blurring value acquisition, a sum of pixel values of the row where the pixel is located (e.g., the $0^{th}$ row) is obtained as the blurring value of the pixel (e.g., the pixel labelled as 0) by subtracting the horizontal summing value corresponding to the pixel ① from the horizontal summing value corresponding to the pixel ②.

It is to be noted that the blurring kernel shape may be not a circle. As illustrated in FIG. 7, there are multiple shapes, such as square illustrated in FIG. 7A, hexagon illustrated in FIG. 7B, heart shape illustrated in FIG. 7C, and five-pointed star shape illustrated in FIG. 7D. The way of obtaining the offsets is the same with the way of obtaining the offsets corresponding to the circle, which is not repeated here. It can be understood that, in FIGS. 7A-7D, a pixel provided with one of numerals 0-9 within the blurring kernel shape can be used as a central pixel of the row where the pixel is located, the pixel ① represents a pixel before the leftmost pixel, and the pixel ② represents the rightmost pixel. Details can refer to the description of FIG. 6, which is not repeated here.

Figure 8A:
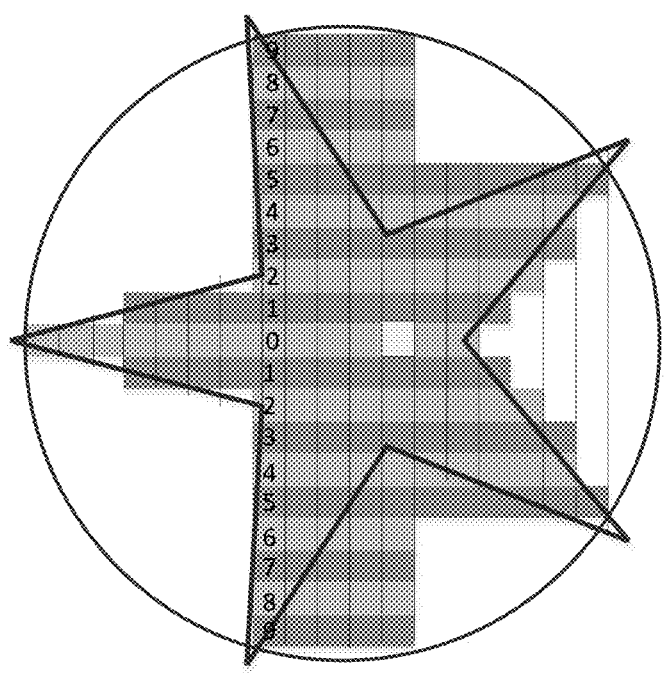
FIG. 8A is a schematic diagram illustrating a minimum circumscribed circle of the five-pointed-star-shape blurring kernel according to some embodiments of the disclosure.
Figure 8B:
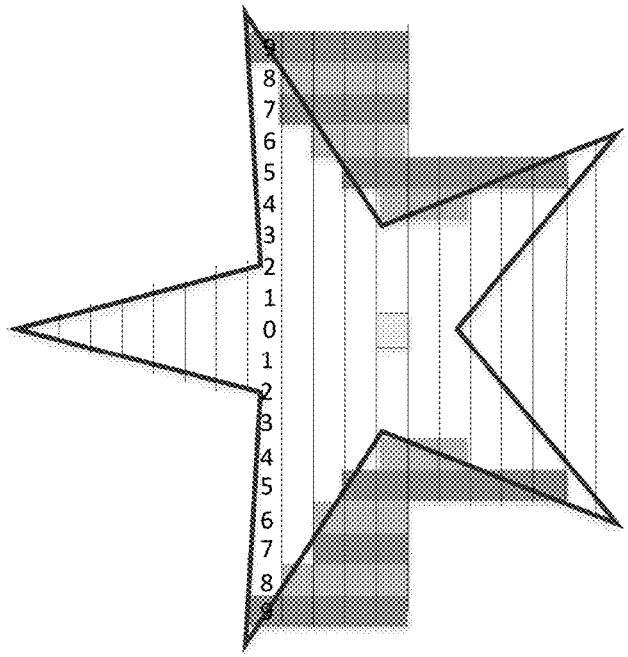
FIG. 8B is a schematic diagram illustrating a to-be-subtracted shape of the five-pointed-star-shape blurring kernel according to some embodiments of the disclosure.

It is to be noted that the blurring kernel shape can be a convex shape, such as circle, square, polygon, and heart shape, and also be a non-convex shape, such as five-pointed star shape. For the convex shapes, the blurring value of the pixel can be obtained through the subtraction operation on the horizontal summing values of the pixel on the left of the leftmost pixel and the rightmost pixel of the same row where the pixel is located within the blurring kernel shape. For the non-convex shape, the blurring value of the pixel cannot be obtained through the subtraction operation. Therefore, when the blurring kernel shape is non-convex, the non-convex shape is converted into a combination of a minimum circumscribed shape and a to-be-subtracted shape. The minimum circumscribed shape satisfies a limitation of covering the whole blurring kernel shape and each row having two endpoints. Taking the five-pointed star shape as an example, the five-pointed star shape can be converted into a combination of the minimum circumscribed shape, such as a circle illustrated in FIG. 8A, and the to-be-subtracted shape illustrated in FIG. 8B. That is, the five-pointed star shape is converted into two convex shapes. It can be understood that a correspondence and a correction correspondence can be established for the offsets. The correspondence can be obtained through the above operations and refers to a correspondence between the blurring kernel offset and the blurring kernel radius corresponding to the minimum circumscribed shape. The correction correspondence is between the blurring kernel offset and the blurring kernel radius corresponding to the to-be-subtracted shape, i.e., the correction correspondence between the blurring kernel offset and the blurring kernel radius within the preset blurring kernel shape. Therefore, for obtaining the blurring value of the pixel, a blurring value can be obtained based on the correspondence, and another blurring value can be obtained based on the correction correspondence. Subtraction operation can be performed on these two blurring values to obtain the target blurring value of the pixel.

As illustrated in FIG. 5, in block 52, the processor can obtain a first horizontal summing value corresponding to the first offset in the horizontal summed area table and a second horizontal summing value corresponding to the second offset in the horizontal summed area table for the row where the pixel is located within the blurring kernel shape. For obtaining the first weighted blurring image, the horizontal summed area table is the first horizontal summed area table. For obtaining the second weighted blurring image, the horizontal summed area table is the second horizontal summed area table.

At block 53, the processor can obtain the sum of pixel values of pixels for the row within the blurring kernel shape based on the first horizontal summing value and the second horizontal summing value. That is, obtaining the sum of the pixel values of a single row of pixels is converted into obtaining the horizontal summing values of two endpoints of the row, which is represented by a following equation:

$$\text{Blur}_{bias}(x,y) = \text{SAT}(x+\text{bias}, y+\text{right\_offset}) - \text{SAT}(x+\text{bias}, y-\text{left\_offset}-1),$$

where, $\text{Blur}_{bias}(x,y)$ represents the sum of pixel values of pixels on the row within the blurring kernel shape (i.e., the blurring value of a single row of pixels); right_offset represents the rightmost pixel, left offset represents the leftmost pixel, y−left_offset−1 represents the pixel on the left of the leftmost pixel, SAT(x+bias,y+right_offset) represents the horizontal summing value corresponding to the rightmost pixel on the $(x+\text{bias})^{th}$ row, i.e., the second horizontal summing value; SAT(x+bias,y−left_offset−1) represents the horizontal summing value corresponding to the pixel on the left of the leftmost pixel on the $(x+\text{bias})^{th}$ row, i.e., the second horizontal summing value.

At block 54, the processor can sum up the pixel values of each row within the blurring kernel shape to obtain the initial blurring value of the pixel, which is represented by a following equation:

$$\text{Blur}_{radius}(x,y) = \Sigma_{bias} \text{Blur}_{bias}.$$

It can be understood that when the size of the input image is M*N, the complexity of the above blurring value acquisition is M*N*radius*2, which is less than M*N*radius*radius in the related arts. That is, the horizontal summed area table can reduce the time complexity in the disclosure.

It is to be noted that details of obtaining the blurring value corresponding to the pixel based on the second horizontal summed area table, the actual blurring kernel radius and the preset blurring kernel shape is the same with that described in combination with FIG. 5, which can refer to descriptions of FIG. 5 and is not repeated here.

Since the blurring kernel shape may be a convex shape or a non-convex shape, in the disclosure, the processor can determine whether the blurring kernel shape is the convex shape or the non-convex shape. When the blurring kernel shape is the convex shape, no correction is performed and the processor can determine the initial blurring value of the pixel is the target blurring value.

Figure 9:
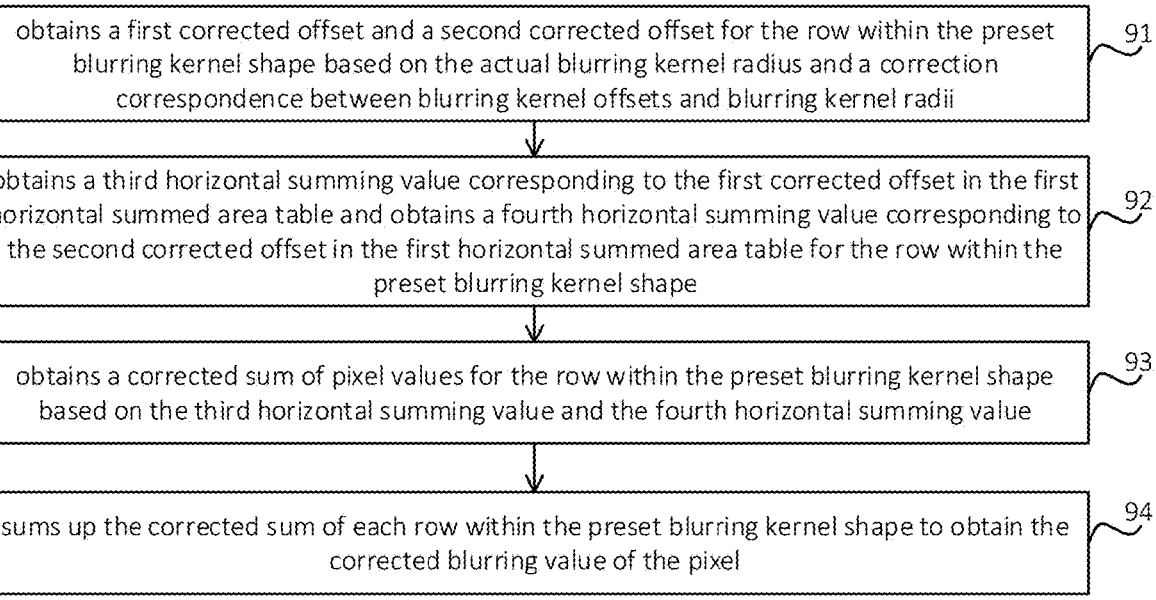
FIG. 9 is a flowchart of obtaining a correction blurring value according to some embodiments of the disclosure.

When the blurring kernel shape is the non-convex shape, correction is required. The processor may obtain an initial blurring value, obtain a corrected blurring value corresponding to the pixel based on the above-mentioned correction correspondence, and correct the initial blurring value based on the corrected blurring value to obtain the target blurring value. As illustrated in FIG. 9, obtaining the corrected blurring value includes the following.

At block 91, the processor can obtain a preset correction correspondence between the blurring kernel offsets and the blurring kernel radii and obtain a first corrected offset and a second corrected offset corresponding to the row where the pixel is located within the blurring kernel shape based on the actual blurring kernel radius corresponding to the pixel and the preset correction correspondence. The implementation of the block 91 is the same as that of the block 51, which can refer to the descriptions of block 51.

In block 92, for the row within the blurring kernel shape, the processor may obtain a third horizontal summing value corresponding to the first corrected offset in a first horizontal summed area table and a fourth horizontal summing value corresponding to the second corrected offset in the first horizontal summed area table. The implementation of the block 92 is the same with that of the block 52, which can refer to the descriptions of block 52.

In block 93, The processor can obtain a corrected sum of pixel values for the row within the blurring kernel shape based on the third horizontal summing value and the fourth horizontal summing value. The implementation of the block 93 is the same with that of the block 83, which can refer to the descriptions of block 53.

In block 94, the processor can sum up the corrected sum of each row within the blurring kernel shape to obtain the corrected blurring value of the pixel. The implementation of the block 94 is the same with that of the block 54, which can refer to the descriptions of the block 54.

After obtaining the blurring value corresponding to the pixel, the processor can determine whether the remainder obtained in the remainder operation of the block 43 is zero. When the remainder is zero, the processor determines the blurring value of the pixel as the target blurring value. When the remainder is a non-zero value, the processor subtracts 1 from the actual blurring kernel radius to obtain a first blurring kernel radius (which is represented by radius−1) and obtains the blurring value of the pixel based on the first blurring kernel radius, i.e., the radius−1, which can refer to the descriptions of FIG. 5. The processor can obtain a weighted blurring value of the pixel based on the actual blurring kernel radius, the remainder, the blurring value obtained based on the actual blurring kernel radius, and the blurring value obtained based on the first blurring kernel radius. The processor determines the weighted blurring value as the target blurring value, which is represented by a following equation:

$$Blur(x,y)=(radius-res)*Blur_{radius}(x,y)+res*Blur_{radius-1}(x,y),$$

where, $Blur_{radius}(x,y)$ represents the blurring value obtained based on the actual blurring kernel radius and $Blur_{radius-1}(x,y)$ represents the blurring value obtained based on the first blurring kernel radius.

It can be understood that in the disclosure, the blurring values corresponding to similar radii can be weighted to realize smooth transition, thereby solving a problem that it is difficult to achieve a fraction blurring kernel radius on a discrete image. In some examples, the similar radii refer to adjacent integers, such as one radius equals to 3 and the other one equals to 2 or 4, or one radius equals to 25 and the other one equals to 24 or 26.

It is to be noted that the smoothing operation is performed on both the weight matrix and the weight image.

Figure 10A:
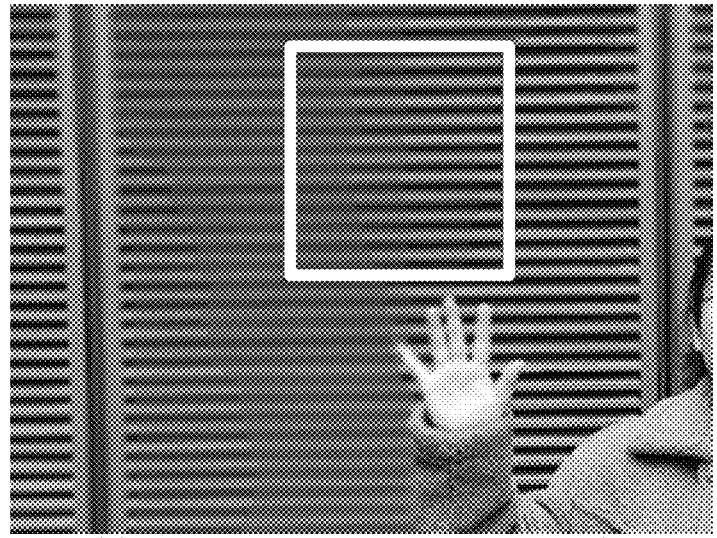
FIG. 10A is a schematic diagram illustrating an image without blurring value smoothing operation according to embodiments of the disclosure.
Figure 10B:
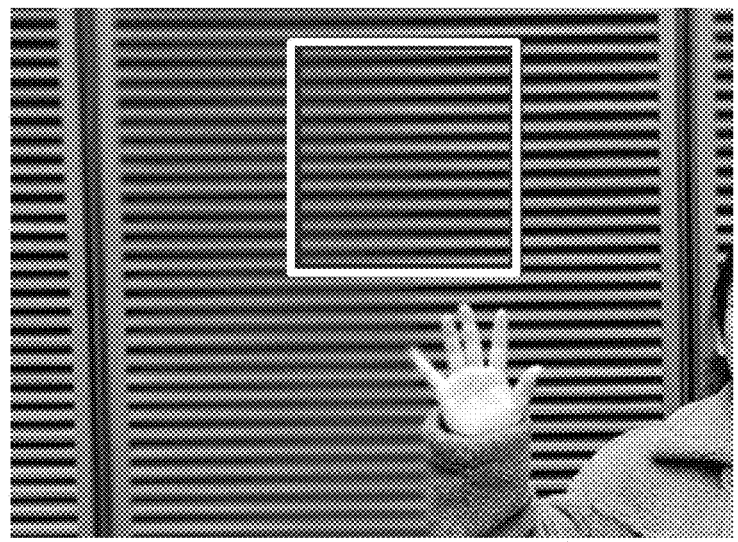
FIG. 10B is a schematic diagram illustrating an image with blurring value smoothing operation according to embodiments of the disclosure.
Figure 11A:
FIG. 11A is a schematic diagram illustrating a target image obtained with a circular blurring kernel according to embodiments of the disclosure.
Figure 11B:
FIG. 11B is a schematic diagram illustrating a target image obtained with a square blurring kernel according to embodiments of the disclosure.
Figure 11C:
FIG. 11C is a schematic diagram illustrating a target image obtained with a hexagonal blurring kernel according to embodiments of the disclosure.
Figure 11D:
FIG. 11D is a schematic diagram illustrating a target image obtained with a ring shape blurring kernel according to embodiments of the disclosure.

In block 15, a ratio of the blurring value corresponding to the pixel in the second weighted blurring image to the blurring value corresponding to the pixel in the first weighted blurring image is obtained. The ratio is used as the pixel value of the pixel contained in the target image. The target image is a blurred image obtained after blurring the input image. FIG. 10 illustrates an effect comparison between images before and after performing the method according to the disclosure. The blurring layered situation appears in FIG. 10A, but no blurring layered situation appears in FIG. 10B. FIG. 11 illustrates effects of multiple target images corresponding different blurring kernel shapes. For example, FIG. 11A corresponds to a circular blurring kernel and the shape of the light spot is circle. FIG. 11B corresponds to a square blurring kernel and the shape of the light spot is square. FIG. 11C corresponds to a hexagonal blurring kernel and the shape of the light spot is hexagon. FIG. 11D corresponds to a ring shape blurring kernel and the shape of the light spot is ring shaped.

Figure 12:
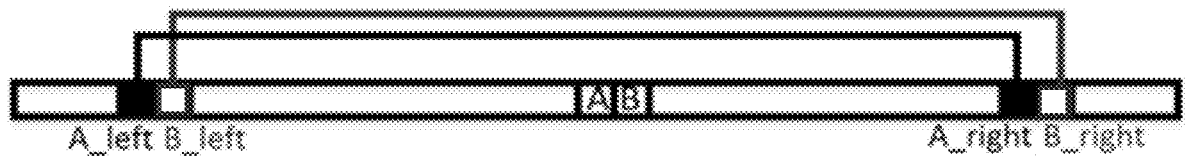
FIG. 12 is a schematic diagram illustrating an effect generated by performing subtraction operation on two adjacent pixels to obtain the blurring value according to embodiments of the disclosure.

The above-mentioned method for processing an image can be implemented by adopting a DSP chip. That is, the DSP chip can obtain the blurring values for different pixels in parallel to improve the processing speed. In addition, for pixels on the same row and corresponding to the same blurring kernel radius, the blurring value acquisition is equivalent to performing the same processing on adjacent pixels with the same offset, which conforms to an acceleration idea of single instruction multiple data stream (SIMD). As illustrated in FIG. 12, the blurring values of adjacent central pixels A and B can be obtained based on the subtraction operation on the pixel values of their adjacent pixels, i.e., A_left, B_left, A_right, and B_left, and 32 pixels can be processed in parallel on the DSP by using the pixel sliding window. The above operation is performed by traversing the whole image to obtain the target image. Therefore, the computational complexity of the image blurring is further reduced to M*N*radius*2/32, to realize high-performance blurring and rendering.

Figure 13:
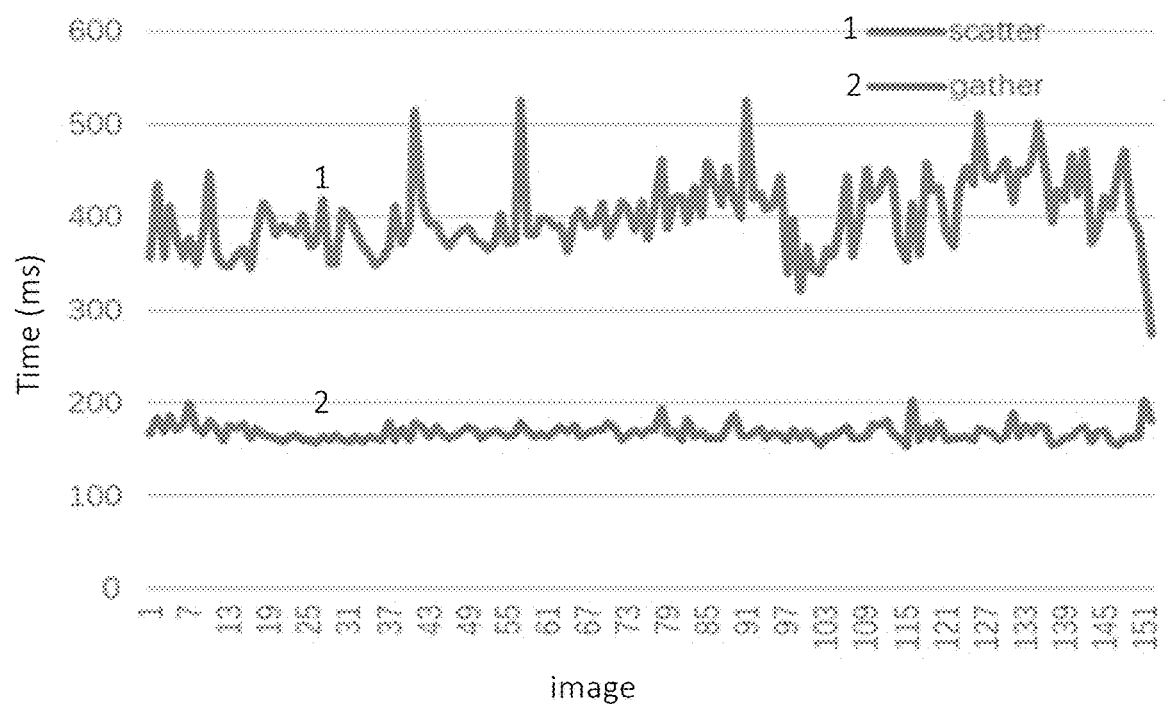
FIG. 13 is a schematic diagram illustrating a time comparison between the scattering blur and the gathering blur according to embodiments of the disclosure.

For example, the electronic device is a smart phone, using the Qualcomm Snapdragon 865 platform, the captured image is down-sampled to obtain an image with the resolution of 1500*2000. The scattering blur is compared with the gathering blur after the DSP acceleration according to the disclosure, as illustrated in Table 2 and FIG. 13.

TABLE 2 time comparison between Scattering blur and Gathering Blur

| Method | Scattering | Gathering | difference |
|---|---|---|---|
| Time (ms) | 401.29 | 167.97 | 233.32 |

Figure 14:
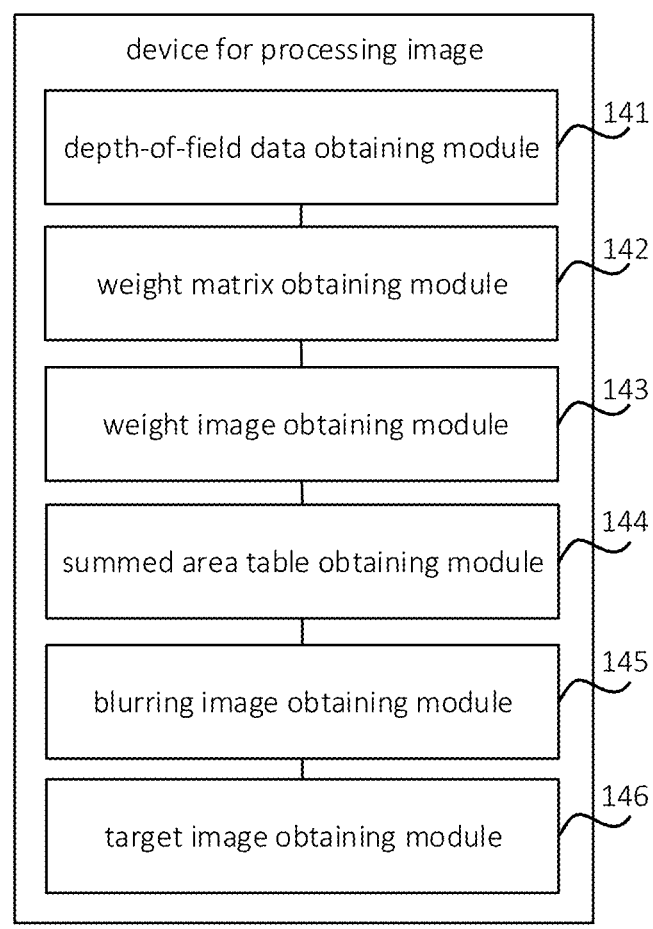
FIG. 14 is a block diagram illustrating a device for processing an image according to embodiments of the disclosure.

On the basis of the above-mentioned method for processing an image, embodiments of the disclosure further provide a device for processing an image. As illustrated in FIG. 14, the device includes a depth-of-field data obtaining module 141, a weight matrix obtaining module 142, a weight image obtaining module 143, a summed area table obtaining module 144, a blurring image obtaining module 145, and a target image obtaining module 146.

The depth-of-field data obtaining module 141 is configured to obtain depth-of-field data of an input image.

The weight matrix obtaining module 142 is configured to obtain a weight matrix of the input image based on the depth-of-field data.

The weight image obtaining module 143 is configured to obtain a product of a weight corresponding to a pixel in the weight matrix and a pixel value corresponding to the pixel in the input image and obtain a weight image. The product is the pixel value of the pixel in the weight image.

The summed area table obtaining module 144 is configured to obtain a first horizontal summed area table corresponding to the weight matrix by performing horizontal summing operation on the weight matrix and obtain a second horizontal summed area table corresponding to the weight image by performing the horizontal summing operation on the weight image. The horizontal summing operation refers to obtaining a sum of the pixel value of the pixel and pixel values of pixels before the pixel and on the same row with the pixel.

The blurring image obtaining module 145 is configured to obtain the blurring value of the pixel contained in the weight matrix based on the first horizontal summed area table and obtain a first weighted blurring image corresponding to the weight matrix; and obtain the blurring value of the pixel contained in the weight image based on the second horizontal summed area table and obtain a second weighted blurring image corresponding to the weight image.

The target image obtaining module 146 is configured to obtain a target image corresponding to the input image based on the first weighted blurring image and the second weighted blurring image. The target image is obtained after blurring the input image.

In some examples, the weight matrix obtaining module includes a weight matrix obtaining submodule.

The weight matrix obtaining submodule is configured to obtain the weight matrix of the input image by setting weights of pixels within a depth-of-field range to zero and setting weights of pixels outside the depth-of-field to a preset value.

In some examples, the weight matrix obtaining submodule includes a pixel value comparing unit and a weight setting unit.

The pixel value comparing unit is configured to compare pixel values of the pixels outside the depth-of-field with a preset pixel value threshold.

The weight setting unit is configured to set the weight of a pixel to a preset first value when the pixel value of the pixel is less than the preset pixel value threshold, and set the weight of a pixel to a preset second value when the pixel value of the pixel exceeds the preset pixel value threshold. The preset first value is less than the preset second value.

In some examples, the summed area table obtaining module includes a padding submodule and a summing submodule.

The padding submodule is configured to obtain a padded weight matrix by padding the weight matrix and obtain a padded weight image by padding the weight image.

The summing submodule is configured to obtain the sum of the pixel value of the pixel and the pixel value of the pixels before the pixel and on the same row with the pixel, use the sum as a horizontal summing value of the pixel to obtain the first horizontal summed area table corresponding to the weight matrix and the second horizontal summed area table corresponding to the weight image.

In some examples, the blurring image obtaining module includes an initial radius obtaining submodule, an actual radius obtaining submodule, and a blurring value obtaining submodule.

The initial radius obtaining submodule is configured to obtain an initial blurring kernel radius corresponding to the pixel contained in the input image based on depth data of the input image.

The actual radius obtaining submodule is configured to perform a remainder operation on the initial blurring kernel radius based on the preset number of grades and determine a quotient obtained by performing the remainder operation as an actual blurring kernel radius corresponding to the pixel.

The blurring value obtaining submodule is configured to determine the blurring value of the pixel based on the first horizontal summed area table, the actual blurring kernel radius and a preset blurring kernel shape to obtain the first weighted blurring image corresponding to the weight matrix.

In some examples, the blurring image obtaining module includes an initial radius obtaining submodule, an actual radius obtaining submodule and a blurring image obtaining submodule.

The initial radius obtaining submodule is configured to an initial blurring kernel radius corresponding to each pixel contained in the weight image based on depth data of the input image.

The actual radius obtaining submodule is configured to perform a remainder operation on the initial blurring kernel radius based on the preset number of grades and determine a quotient obtained by performing the remainder operation as an actual blurring kernel radius.

The blurring image obtaining submodule is configured to determine the blurring value corresponding to the pixel based on the second horizontal summed area table, the actual blurring kernel radius and a preset blurring kernel shape to obtain the second weighted blurring image corresponding to the weight image.

In some examples, the blurring value obtaining submodule includes an offset obtaining unit, a summing value obtaining unit, a pixel value summation obtaining unit and an initial blurring value obtaining unit.

The offset obtaining unit is configured to obtain a first offset and a second offset for a row where the pixel is located within the blurring kernel shape based on the actual blurring kernel radius corresponding to the pixel and a correspondence between blurring kernel offsets and blurring kernel radii. The correspondence corresponds to the blurring kernel shape.

The summing value obtaining unit is configured to obtain a first horizontal summing value corresponding to the first offset in a horizontal summed area table and a second horizontal summing value corresponding to the second offset in a horizontal summed area table. For obtaining the first weighted blurring image, the horizontal summed area table is the first horizontal summed area table. For obtaining the second weighted blurring image, the horizontal summed area table is the second horizontal summed area table.

The pixel value summation obtaining unit is configured to obtain the sum of pixel values for the row within the blurring kernel shape based on the first horizontal summing value and the second horizontal summing value.

The initial blurring value obtaining unit is configured to sum up the sum of each row within the blurring kernel shape to obtain an initial blurring value of the pixel.

In some examples, the blurring value obtaining submodule further includes a first blurring value determining unit and a second blurring value determining unit.

The first blurring value determining unit is configured to determine the initial blurring value of a target blurring value when the blurring kernel shape is convex.

The second blurring value determining unit is configured to obtain a corrected blurring value of the pixel and obtain the target blurring value by correcting the initial blurring value based on the corrected blurring value when the blurring kernel shape is non-convex.

In some examples, the second blurring value determining unit includes an offset obtaining subunit, a summing value obtaining subunit, a corrected value obtaining subunit, and a blurring value obtaining subunit.

The offset obtaining subunit is configured to obtain a first corrected offset and a second corrected offset for the row within the blurring kernel shape based on the actual blurring kernel radius corresponding to the pixel and a correction correspondence between blurring kernel offsets and blurring kernel radii. The correction correspondence corresponds to the blurring kernel shape.

The summing value obtaining subunit is configured to obtain a third horizontal summing value corresponding to the first corrected offset in the first horizontal summed area table and a fourth horizontal summing value corresponding to the second corrected offset in the first horizontal summed area table.

The corrected value obtaining subunit is configured to obtain a corrected sum of pixel value for the two within the blurring kernel shape based on the third horizontal summing value and the fourth horizontal summing value.

The blurring value obtaining subunit is configured to sum up the corrected sum of each row within the blurring kernel shape to obtain a corrected blurring value of each pixel.

In some examples, the burring image obtaining module further includes a first radius obtaining submodule and a target blurring value obtaining submodule.

The first radius obtaining submodule is configured to obtain a first blurring kernel radius by subtracting 1 from the actual blurring kernel radius when the remainder is non-zero and obtain the blurring value of the pixel based on the first blurring kernel radius.

The target blurring value obtaining submodule is configured to obtain a weighted blurring value of the pixel based on the actual blurring kernel radius, the remainder, the blurring value of the pixel corresponding to the actual blurring kernel radius, and the blurring value of the pixel corresponding to the first blurring kernel radius, and determine the weighted blurring value as the target blurring value.

In the disclosure, by obtaining the horizontal summed area tables, the acquisition of the sum of pixel values on the signal row can be converted into addition operation or subtraction operation on the summing values of two pixels. The number of operations in the disclosure is less than 4 operations in the related arts to save calculation time. In addition, after obtaining the sum of pixel values for each row, the sum of each row is summed up to obtain the blurring value of the pixel. In other words, the length of each row is not limited in the disclosure, and different numbers of pixels in a row can form any blurring kernel shape. That is, the disclosure can be applied to any blurring kernel shapes, which can increase the application scope.

It can be understood that the device of the disclosure corresponds to the method of FIG. 1, and details of the device can refer to the descriptions about the method embodiments, which is not repeated here.

Figure 15:
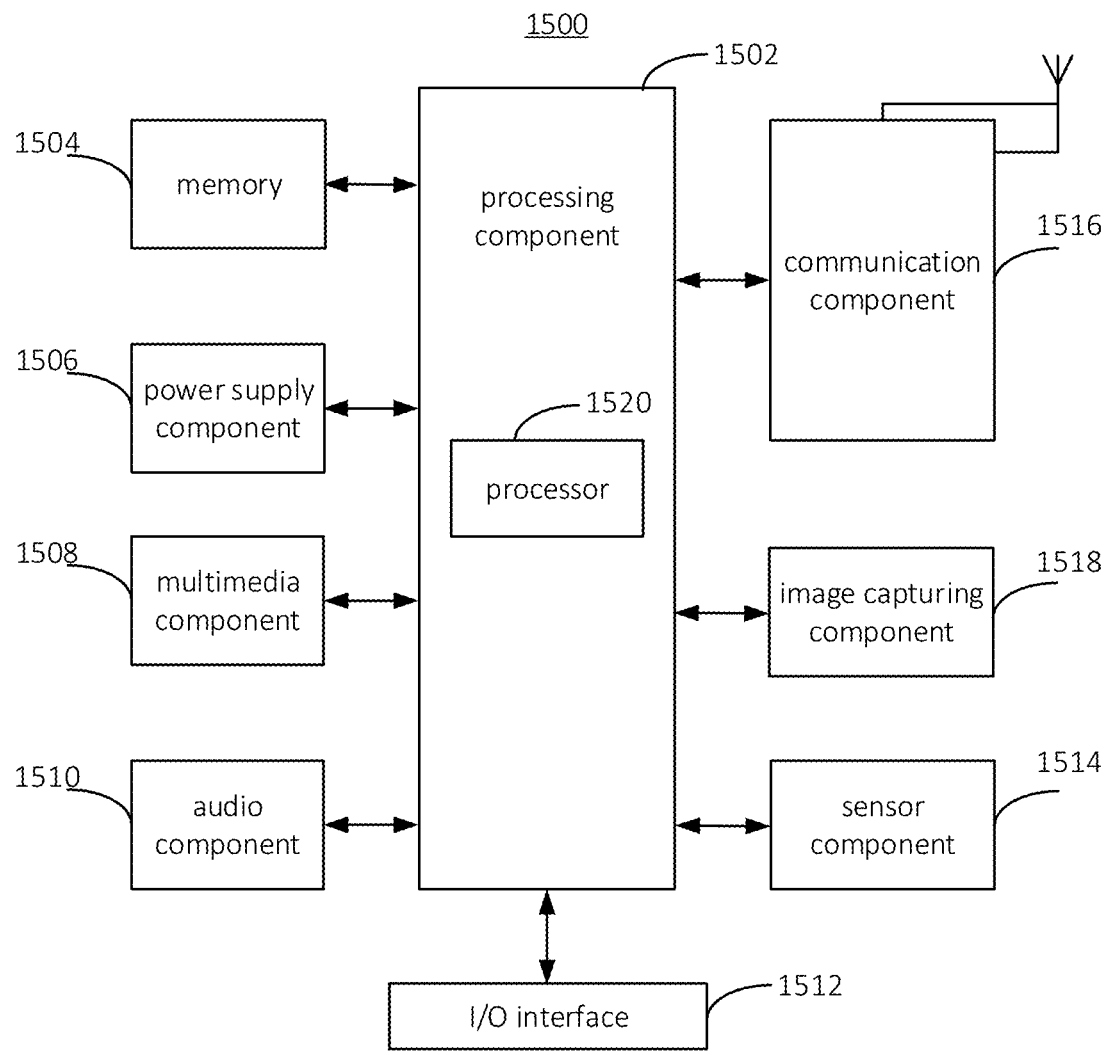
FIG. 15 is a block diagram illustrating an electronic device according to embodiments of the disclosure.

FIG. 15 is a block diagram illustrating an electronic device according to some embodiments of the disclosure. For example, the electronic device 1500 may be a mobile phone, a computer, a digital broadcasting device, a tablet device, a medical device, a fitness device, a personal digital assistant, etc.

As illustrated in FIG. 15, the device 1500 may include one or more of the following components: a processing component 1502, a memory 1504, a power supply component 1506, a multimedia component 1508, an audio component 1510, an input/output (I/O) interface 1512, a sensor component 1514, a communication component 1516, and an image capturing component 1518.

The processing component 1502 generally controls the overall operations of the electronic device 1500, such as operations associated with display, telephone calls, data communications, camera operations, and recording operations. The processing component 1502 may include one or more processors 1520 to execute computer instructions. In addition, the processing component 1502 may include one or more modules to facilitate the interaction between the processing component 1502 and other components. For example, the processing component 1502 may include a multimedia module to facilitate the interaction between the multimedia component 1508 and the processing component 1502.

The memory 1504 is configured to store various types of data to support operations in the electronic device 1500. Examples of these data include computer instructions for any application or method operated on the electronic device 1500, contact data, phone book data, messages, pictures, videos, etc. The memory 1504 can be implemented by any type of volatile or non-volatile storage device or their combination, such as static random-access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The power supply component 1506 provides power for various components of the electronic device 1500. The power supply component 1506 may include a power management system, one or more power supplies, and other components associated with the generation, management, and distribution of power for the electronic device 1500. The power supply component 1506 may include a power supply chip. The controller may communicate with the power supply chip, to control the power supply chip to turn on or off the switching device, so that the battery supplies power to the main board circuit or does not supply power.

The multimedia component 1508 includes a screen that provides an output interface between the electronic device 1500 and a target object. In some embodiments, the screen may include a liquid crystal display (LCD) and a touch panel (TP). If the screen includes a touch panel, the screen may be implemented as a touch screen to receive input signals from the target object. The touch panel includes one or more touch sensors to sense touch, sliding, and gestures on the touch panel. The touch sensor may not only sense the boundary of the touch or sliding action, but also detect the duration and pressure related to the touch or sliding operation.

The audio component 1510 is configured to output and/or input audio signals. For example, the audio component 1510 includes a microphone (MIC). When the electronic device 1500 is in an operation mode, such as a call mode, a recording mode, and a voice recognition mode, the microphone is configured to receive external audio signals. The received audio signal can be further stored in the memory 1504 or sent via the communication component 1516. In some embodiments, the audio component 1510 further includes a speaker for outputting audio signals.

The I/O interface 1512 provides an interface between the processing component 1502 and a peripheral interface module. The above-mentioned peripheral interface module may be a keyboard, a click wheel, a button, and the like.

The sensor component 1514 includes one or more sensors for providing the electronic device 1500 with various status assessments. For example, the sensor component 1514 can detect the open/close status of the electronic device 1500 and the relative positioning of components. For example, the component is the display and the keypad of the electronic device 1500. The sensor component 1514 can also detect the position change of the electronic device 1500 or a component of the electronic device 1500, the presence or absence of contact between the target object and the electronic device 1500, the orientation or acceleration/deceleration of the electronic device 1500, and the temperature change of the electronic device 1500. The sensor component 1514 may include a magnetic sensor, a gyroscope, and a magnetic field sensor. The magnetic field sensor includes at least one of: a Hall sensor, a thin film magneto-resistive sensor, and a magnetic liquid acceleration sensor.

The communication component 1516 is configured to facilitate wired or wireless communication between the electronic device 1500 and other devices. The electronic device 1500 can access a wireless network based on a communication standard, such as Wi-Fi, 2G, 3G, 4G, 5G or a combination thereof. In an exemplary embodiment, the communication component 1516 receives a broadcast signal or broadcast related information from an external broadcast management system via a broadcast channel. In an exemplary embodiment, the communication component 1516 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the electronic device 1500 may be implemented by one or more application specific integrated circuits (ASIC), digital signal processors (DSP), digital signal processing devices (DSPD), programmable logic devices (PLD), field programmable I gate array (FPGA), controller, microcontroller, microprocessor, or other electronic components. In an example, the processor includes the DSP. The DSP is configured to process the pixels on the same row and corresponding to the same blurring kernel radius within the blurring kernel shape in parallel to realize SIMD.

In some embodiments, there is also provided a non-transitory computer-readable storage medium including executable instructions stored thereon, such as the memory 1004 including instructions. The executable instructions may be executed by a processor. The storage medium may be ROM, random access memory (RAM), CD-ROM, magnetic tape, floppy disk, optical data storage device, etc.

Those skilled in the art will easily come up with other embodiments of the disclosure after considering the description and practicing the disclosure herein. The disclosure is intended to cover any variations, uses or adaptations of the disclosure, and these variations, uses or adaptations follow the general principles of the disclosure and include common general knowledge or frequently used technical means in the technical field not disclosed in the disclosure. The description and the embodiments are only regarded as exemplary, and the true scope and spirit of the disclosure are indicated by the following claims.

It should be understood that the disclosure is not limited to the precise structure described above and shown in the drawings, and various modifications and changes can be made without departing from the scope of the disclosure. The scope of the disclosure is limited only by the appended claims.

What is claimed is:

1. A method of processing an image, comprising:
   obtaining depth-of-field data of an input image and obtaining a weight matrix of the input image based on the depth-of-field data;
   obtaining a product of a weight corresponding to a pixel in the weight matrix and a pixel value corresponding to the pixel in the input image and obtaining a weight image, wherein the product is the pixel value of the pixel in the weight image;
   obtaining a first horizontal summed area table corresponding to the weight matrix by performing a horizontal summing operation on the weight matrix and obtaining a second horizontal summed area table corresponding to the weight image by performing the horizontal summing operation on the weight image, wherein the horizontal summing operation refers to, obtaining a sum of the pixel value of a pixel and pixel value of pixels before the pixel and on the same row with the pixel;
   obtaining a blurring value corresponding to the pixel of the weight matrix based on the first horizontal summed area table and obtaining a first weighted blurring image corresponding to the weight matrix, and obtaining a blurring value corresponding to the pixel of the weight image based on the second horizontal summed area table and obtaining a second weighted blurring image corresponding to the weight image; and
   obtaining a ratio of the blurring value corresponding to the pixel in the second weighted blurring image to the blurring value corresponding to the pixel in the first weighted blurring image, and determining the ratio as the pixel value corresponding to the pixel in a target image; the target image being obtained by blurring the input image.

2. The method of claim 1, wherein obtaining the weight matrix comprises:
   obtaining the weight matrix of the input image by setting weights of pixels within a depth-of-field range to zero and setting weights of pixels outside the depth-of-field range to a preset value based on the depth-of-field data.

3. The method of claim 2, wherein setting the weights of pixels outside the depth-of-field range to the preset value comprises:
   setting the weight of a pixel as a preset first value based on the pixel value of the pixel being less than a preset pixel value threshold; and
   setting the weight of a pixel as a preset second value based on the pixel value of the pixel exceeding the preset pixel value threshold, the preset first value being less than the preset second value.

4. The method of claim 1, wherein obtaining the first horizontal summed area table and obtaining the second horizontal summed area table comprises:

obtaining a padded weight matrix by padding the weight matrix and obtaining a padded weight image by padding the weight image;

obtaining the sum of the pixel value of the pixel and pixel value of pixels before the pixel and on the same row with the pixel within the blurring kernel shape based on the padded weight matrix and the padded weight image; and determining the sum as a horizontal summing value of the pixel to obtain the first horizontal summed area table corresponding to the weight matrix and the second horizontal summed area table corresponding to the weight image.

5. The method of claim 1, wherein obtaining the blurring value corresponding to the pixel in the weight matrix based on the first horizontal summed area table and obtaining the blurring value corresponding to the pixel in the weight image based on the second horizontal summed area table comprises:

obtaining an initial blurring kernel radius corresponding to the pixel in the input image based on the depth-of-field data of the input image;

performing remainder operation on the initial blurring kernel radius based on the preset number of grades and determining a quotient obtained by performing the remainder operation as an actual blurring kernel radius;

determining the blurring value corresponding to the pixel based on the actual blurring kernel radius and a preset blurring kernel shape and according to the first horizontal summed area table, and obtaining the first weighted blurring image corresponding to the weight matrix; and determining the blurring value corresponding to the pixel based on the actual blurring kernel radius and a preset blurring kernel shape and according to the second horizontal summed area table, and obtaining the second weighted blurring image corresponding to the weight image.

6. The method of claim 5, wherein determining the blurring value corresponding to the pixel based on the actual blurring kernel radius and the preset blurring kernel shape comprises:

obtaining a first offset and a second offset for a row where the pixel is located within the preset blurring kernel shape based on the actual blurring kernel radius and a correspondence between blurring kernel offsets and blurring kernel radii, wherein the correspondence corresponds to the preset blurring kernel shape;

obtaining a first horizontal summing value corresponding to the first offset in a horizontal summed area table and obtaining a second horizontal summing value corresponding to the second offset in a horizontal summed area table for the row within the preset blurring kernel shape, wherein for obtaining the first weighted blurring image, the horizontal summed area table is the first horizontal summed area table, and for the second weighted blurring image, the horizontal summed area table is the second horizontal summed area table;

obtaining a sum of pixel values for the row within the preset blurring kernel shape based on the first horizontal summing value and the second horizontal summing value;

summing up the sum of each row within the preset blurring kernel shape to obtain the initial blurring value of the pixel; and determining the blurring value corresponding to the pixel based on the initial blurring value of the pixel.

7. The method of claim 6, wherein determining the blurring value corresponding to the pixel based on the initial blurring value of the pixel comprises:

determining the initial blurring value as the blurring value based on the preset blurring kernel shape being convex; and obtaining a corrected blurring value of the pixel and correcting the initial blurring value based on the corrected blurring value to obtain the blurring value based on the preset blurring kernel shape being non-convex.

8. The method of claim 7, wherein obtaining the corrected blurring value of the pixel comprises:

obtaining a first corrected offset and a second corrected offset for the row within the preset blurring kernel shape based on the actual blurring kernel radius and a correction correspondence between blurring kernel offsets and blurring kernel radii, wherein the correction correspondence corresponds to the preset blurring kernel shape;

obtaining a third horizontal summing value corresponding to the first corrected offset in the first horizontal summed area table and obtaining a fourth horizontal summing value corresponding to the second corrected offset in the first horizontal summed area table for the row within the preset blurring kernel shape;

obtaining a corrected sum of pixel values for the row within the preset blurring kernel shape based on the third horizontal summing value and the fourth horizontal summing value; and summing up the corrected sum of each row within the preset blurring kernel shape to obtain the corrected blurring value of the pixel.

9. The method of claim 5, further comprising:

obtaining a first blurring kernel radius by subtracting one from the actual blurring kernel radius and obtaining the blurring value of the pixel based on the first blurring kernel radius based on the remainder being non-zero; and obtaining a weighted blurring value of the pixel based on the actual blurring kernel radius, the remainder, the blurring value of the pixel obtained based on the actual blurring kernel radius, and the blurring value of the pixel obtained based on the first blurring kernel radius, and determining the weighted blurring value as the blurring value of the pixel.

10. An electronic device, comprising:

a processor, a memory, configured to store computer programs executed by the processor;

wherein when the processor executes the computer programs stored in the memory, the processor is configured to:

obtain depth-of-field data of an input image and obtain a weight matrix of the input image based on the depth-of-field data;

obtain a product of a weight corresponding to a pixel in the weight matrix and a pixel value corresponding to the pixel in the input image and obtain a weight image, wherein the product is the pixel value of the pixel in the weight image;

obtain a first horizontal summed area table corresponding to the weight matrix by performing a horizontal summing operation on the weight matrix and obtain a second horizontal summed area table corresponding to the weight image by performing the horizontal summing operation on the weight image, wherein the horizontal summing operation refers to, obtaining a sum of the pixel value of a pixel and pixel value of pixels before the pixel and on the same row with the pixel;

obtain a blurring value corresponding to the pixel of the weight matrix based on the first horizontal summed area table and obtain a first weighted blurring image corresponding to the weight matrix, and obtain a blurring value corresponding to the pixel of the weight image based on the second horizontal summed area table and obtain a second weighted blurring image corresponding to the weight image; and obtain a ratio of the blurring value corresponding to the pixel in the second weighted blurring image to the blurring value corresponding to the pixel in the first weighted blurring image, and determine the ratio as the pixel value corresponding to the pixel in a target image; the target image being obtained by blurring the input image.

11. The electronic device of claim 10, wherein the processor is further configured to:

obtain the weight matrix of the input image by setting weights of pixels within a depth-of-field range to zero and setting weights of pixels outside the depth-of-field range to a preset value based on the depth-of-field data.

12. The electronic device of claim 11, wherein the processor is further configured to:

set the weight of a pixel as a preset first value based on the pixel value of the pixel being less than a preset pixel value threshold; and set the weight of a pixel as a preset second value based on the pixel value of the pixel exceeding the preset pixel value threshold, the preset first value being less than the preset second value.

13. The electronic device of claim 10, wherein the processor is further configured to:

obtain a padded weight matrix by padding the weight matrix and obtain a padded weight image by padding the weight image;

obtain the sum of the pixel value of the pixel and pixel value of pixels before the pixel and on the same row with the pixel within the blurring kernel shape based on the padded weight matrix and the padded weight image; and determine the sum as a horizontal summing value of the pixel to obtain the first horizontal summed area table corresponding to the weight matrix and the second horizontal summed area table corresponding to the weight image.

14. The electronic device of claim 10, wherein the processor is further configured to:

obtain an initial blurring kernel radius corresponding to the pixel in the input image based on the depth-of-field data of the input image;

perform remainder operation on the initial blurring kernel radius based on the preset number of grades and determine a quotient obtained by performing the remainder operation as an actual blurring kernel radius;

determine the blurring value corresponding to the pixel based on the actual blurring kernel radius and a preset blurring kernel shape and according to the first horizontal summed area table, and obtain the first weighted blurring image corresponding to the weight matrix; and determine the blurring value corresponding to the pixel based on the actual blurring kernel radius and a preset blurring kernel shape and according to the second horizontal summed area table, and obtain the second weighted blurring image corresponding to the weight image.

15. The electronic device of claim 14, wherein the processor is further configured to:

obtain a first offset and a second offset for a row where the pixel is located within the preset blurring kernel shape based on the actual blurring kernel radius and a correspondence between blurring kernel offsets and blurring kernel radii, wherein the correspondence corresponds to the preset blurring kernel shape;

obtain a first horizontal summing value corresponding to the first offset in a horizontal summed area table and obtain a second horizontal summing value corresponding to the second offset in a horizontal summed area table for the row within the preset blurring kernel shape, wherein for obtaining the first weighted blurring image, the horizontal summed area table is the first horizontal summed area table, and for the second weighted blurring image, the horizontal summed area table is the second horizontal summed area table;

obtain a sum of pixel values for the row within the preset blurring kernel shape based on the first horizontal summing value and the second horizontal summing value;

sum up the sum of each row within the preset blurring kernel shape to obtain the initial blurring value of the pixel; and determine the blurring value corresponding to the pixel based on the initial blurring value of the pixel.

16. The electronic device of claim 15, wherein the processor is further configured to:

determine the initial blurring value as the blurring value based on the preset blurring kernel shape being convex; and obtain a corrected blurring value of the pixel and correct the initial blurring value based on the corrected blurring value to obtain the blurring value based on the preset blurring kernel shape being non-convex.

17. The electronic device of claim 16, wherein the processor is further configured to:

obtain a first corrected offset and a second corrected offset for the row within the preset blurring kernel shape based on the actual blurring kernel radius and a correction correspondence between blurring kernel offsets and blurring kernel radii, wherein the correction correspondence corresponds to the preset blurring kernel shape;

obtain a third horizontal summing value corresponding to the first corrected offset in the first horizontal summed area table and obtain a fourth horizontal summing value corresponding to the second corrected offset in the first horizontal summed area table for the row within the preset blurring kernel shape;

obtain a corrected sum of pixel values for the row within the preset blurring kernel shape based on the third horizontal summing value and the fourth horizontal summing value; and sum up the corrected sum of each row within the preset blurring kernel shape to obtain the corrected blurring value of the pixel.

18. The electronic device of claim 14, wherein the processor is further configured to:

obtain a first blurring kernel radius by subtracting one from the actual blurring kernel radius and obtain the blurring value of the pixel based on the first blurring kernel radius based on the remainder being non-zero; and obtain a weighted blurring value of the pixel based on the actual blurring kernel radius, the remainder, the blurring value of the pixel obtained based on the actual blurring kernel radius, and the blurring value of the pixel obtained based on the first blurring kernel radius, and determine the weighted blurring value as the blurring value of the pixel.

19. The electronic device of claim 10, wherein the processor comprises a digital signal processing chip, the digital signal processing chip is configured to process pixels on the same row and corresponding to the same blurring kernel radius in parallel to implement signal instruction multiple data stream processing.

20. A non-transitory computer readable storage medium, wherein when computer program stored in the storage medium are executed by a processor, the processor is configured to:

obtain depth-of-field data of an input image and obtain a weight matrix of the input image based on the depth-of-field data;

obtain a product of a weight corresponding to a pixel in the weight matrix and a pixel value corresponding to the pixel in the input image and obtain a weight image, wherein the product is the pixel value of the pixel in the weight image;

obtain a first horizontal summed area table corresponding to the weight matrix by performing a horizontal summing operation on the weight matrix and obtain a second horizontal summed area table corresponding to the weight image by performing the horizontal summing operation on the weight image, wherein the horizontal summing operation refers to, obtaining a sum of the pixel value of a pixel and pixel value of pixels before the pixel and on the same row with the pixel;

obtain a blurring value corresponding to the pixel of the weight matrix based on the first horizontal summed area table and obtain a first weighted blurring image corresponding to the weight matrix, and obtain a blurring value corresponding to the pixel of the weight image based on the second horizontal summed area table and obtain a second weighted blurring image corresponding to the weight image; and obtain a ratio of the blurring value corresponding to the pixel in the second weighted blurring image to the blurring value corresponding to the pixel in the first weighted blurring image, and determine the ratio as the pixel value corresponding to the pixel in a target image; the target image being obtained by blurring the input image.

* * * * *